June 23, 1959 R. P. VAELL ET AL 2,891,847
HYDROCARBON UPGRADING APPARATUS
Filed March 2, 1956
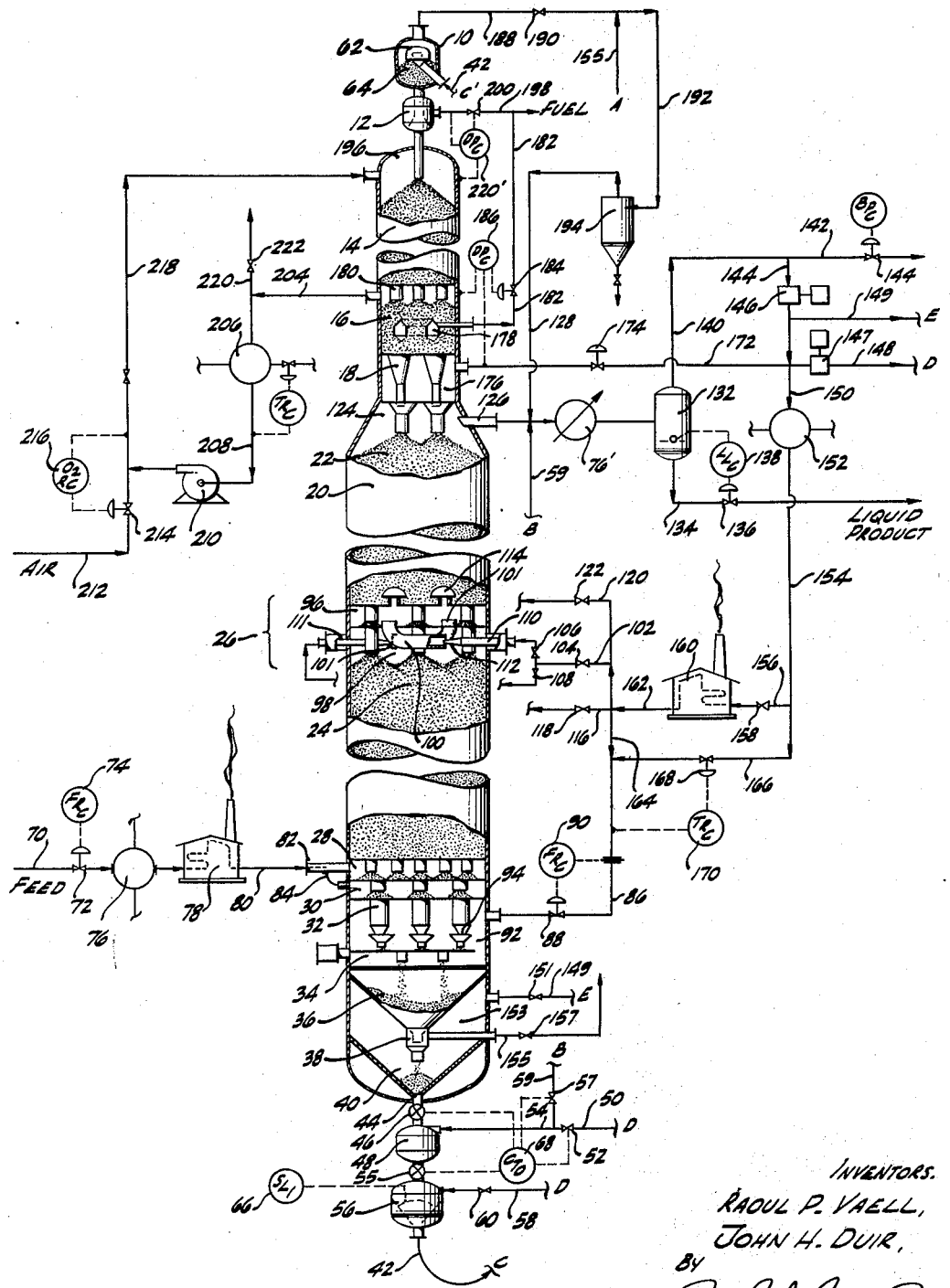
INVENTORS.
RAOUL P. VAELL,
JOHN H. DUIR,
BY
ATTORNEY.

United States Patent Office 2,891,847
Patented June 23, 1959

2,891,847

HYDROCARBON UPGRADING APPARATUS

Raoul P. Vaell, Los Angeles, and John H. Duir, Fullerton, Calif., assignors to Union Oil Company of California, Los Angeles, Calif., a corporation of California Application March 2, 1956, Serial No. 569,196

7 Claims. (Cl. 23—288)

This invention reslates broadly to a process and apparatus for solids-fluid contacting, particularly with a moving or recirculated stream of granular solid contact material. Specifically this invention relates to an improved hydrocarbon treating process in which low-grade hydrocarbon fraction, such as naphtha contaminated with hydrocarbon derivatives of sulfur and nitrogen, is contacted with an upgrading catalyst in the presence of a circulated stream of hydrogen to produce a high-grade hydrocarbon product having a high anti-knock rating and which is substantially free from the sulfur and nitrogen compounds.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 750° F. and including the light and heavy naphthas or gasolines and the light and heavy gas-oil fractions, are treated at relatively high pressures and temperatures in the presence of solid contact materials to desulfurize, denitrogenate, hydrogenate, dehydrogenate, reform, aromatize, isomerize, or polymerize such hydrocarbon fractions to produce such products having desirable properties which particularly well suit them for hydrocarbon cracking feed, gasoline blending stock, or diesel or jet engine fuels and the like.

In the particular processes of desulfurization and reforming by means of which hydrocarbon fractions are up-graded to products of improved characteristics, the thermal effects of the chemical reactions involved cause the temperature of the catalyst and of the reactants to deviate from the desired reaction temperature. For example, during hydrocarbon desulfurization, a net exothermic effect is noted which causes the temperature to increase as much as 200° F. in some cases during the reaction. Similarly, in gasoline reforming, the net thermal effect is endothermic and the temperature of the reacting fluid may drop from 75° F. to 200° F. below the desired temperature. Even in the particular process hereinafter more fully described in which a naphtha fraction is reformed and freed of nitrogen and sulfur compounds by treatment at temperatures of about 900° F. utilizing simultaneous desulfurization and reforming reactions, it has been difficult to compensate for thermal effects occurring during the reaction which tends to change the reaction temperature from the desired value. The complexities of mechanical equipment and the process steps necessary to compensate for these temperature changes have heretofore been such that few, if any, commercial hydrocarbon conversion processes of this type have attempted to correct for these thermal effects.

In the moving solid catalyst processes of the prior art troublesome problems have existed with respect to movement of the solids, solids attrition, and the use of conveyance gases foreign to the fluids involved in the processes. In some processes bucket elevators are employed to recirculate the solids but these causes undue solids attrition and the moving mechanical parts are subject to continual maintenance. Other processes employ dilute phase gas lift or pneumatic conveyors for solids recirculation in which a suspension of the solids is pumped through the conveyance conduit. For the most part such conveyors have required a foreign or separately handled conveyance gas which must be isolated from the other fluids of the processes. Most of the prior art processes require in addition one or more sets of elongated sealing legs, isolating one part of the process from another.

The present invention is directed to an improved process and apparatus which avoids the aforementioned difficulties and provides a process utilizing a moving mass of solid contact material in which the undesirable temperature changes, the unduly high solids attrition, and the foreign or separately handled lift gases are eliminated.

It is therefore a primary object of the present invention to provide an improved process for solids-fluid contacting employing a single column through which the granular solids pass downwardly by gravity in a form of a moving bed.

It is a more specific object of this invention to provide an improved continuous process for the catalytic upgrading of low-grade hydrocarbon fractions to provide a premium quality hydrocarbon product.

It is a specific object of this invention to provide a naphtha desulfurization and reforming process in which a solid cobalt molybdate type catalyst is passed downwardly in a single column successively through zones of catalyst regeneration, catalyst reduction, naphtha reaction, spent catalyst stripping, solids flow control, catalyst elutriation, and catalyst pressuring following which the spent catalyst is recirculated to the top of the column for regeneration as an elongated continuous moving bed through a conveyance zone employing a conveyance fluid which is native to the process.

It is an additional object of this invention to provide in the process defined above the additional steps of premixing the hydrocarbon vapor with at least a portion of the recycle hydrogen prior to contacting this reactant mixture with the catalyst and to inject additional quantities of hydrogen into the reactant mixture at one or more points along the length of the reaction zone so as to control the reaction temperature throughout the reactor.

It is also an object of this invention to provide an improved apparatus adapted to accomplish the foregoing objects.

Other objects and advantages of this invention will become apparent to those skilled in the art as the description and illustration thereof proceed.

Briefly this invention relates to an improved solids-fluid contacting process, specifically a hydrocarbon upgrading process, in which the hydrocarbon is passed at controlled reaction temperatures into contact with an upgrading catalyst in a reaction zone. The catalyst is recirculated through a single contacting vessel which is divided appropriately into a plurality of zones in which the catalyst is successively contacted with different vapor or gaseous media necessary in the process. The catalyst is introduced at the top of the column and passes downwardly as a dense moving bed successively through a regeneration zone, a sealing zone, a catalyst pretreating zone, the hydrocarbon upgrading or treating zone which includes one or a plurality of temperature control zones, a spent catalyst stripping zone, a solids flow control zone, and a solids elutriation zone for the removal of catalyst fines. The regeneration and the reaction or upgrading zones operate at substantially the same pressures. The spent catalyst removed from the bottom of the column is passed into and through a mechanically sealable catalyst pressuring zone in which the catalyst is pressured into the bottom of an elongated conveyance zone. The catalyst is conveyed in the form of a dense packed non-fluidized mass of granular solids through which a fluid is passed as a conveyance medium. Preferably a portion of the reaction zone gas product is passed through the conveyance zone and thus no foreign conveyance gases requiring separate handling are required in this process.

The adverse temperature effects associated with hydrocarbon desulfurization, cracking, hydrocracking, reforming, and others are eliminated by the direct injection of a portion of recycle gas such as hydrogen into the reaction zone at various points along its length. For exothermic reactions like desulfurization the injected hydrogen is unheated, that is, at the same temperature at which it is separated from the partially condensed effluent. In reforming and cracking processes which are endothermic this injected gas is heated to a temperature substantially above the desired reaction temperature, for example temperatures between about 1000° F. and 1500° F. For combined desulfurization and reforming of naphtha, the net temperature effect is generally endothermic and accordingly heated hydrogen is injected for temperature control.

In the present invention the injection hydrogen is introduced into the reaction zone at a point which may be termed a temperature control zone. These zones consist of an upper engaging zone, a lower disengaging zone, and a jet pump mixing zone communicating within the column the engaging zone with the disengaging zone. The details of this temperature control system are more clearly illustrated in the drawings, but briefly a jet of the injection hydrogen is introduced directly into the mixing zone at a point communicating with the lower disengaging zone and, by creating a low pressure region in the mixing zone, the hydrocarbon and hydrogen reactant mixture is disengaged from the catalyst bed below the temperature control zone. The injection hydrogen is thoroughly mixed in the mixing zone with this reactant mixture, flows through the mixing zone into the upper engaging zone at the desired temperature, and is re-engaged with the catalyst bed above in which further reaction takes place.

A similar system is employed in injecting the hydrocarbon to be treated into the reaction zone. Again an upper naphtha engaging zone and a lower disengaging zone are spaced closely adjacent one another just above the spent catalyst stripping zones. An elongated mixing zone opens into the upper engaging zone. A high velocity jet of naphtha vapor is introduced through the mixing zone into the engaging zone. A connection is provided between the disengaging zone and the low pressure mixing zone thereby premixing the naphtha vapor with a mixture of recycle hydrogen and residual naphtha stripped from the spent catalyst in the stripping zones.

These particular mixing steps have been responsible for substantial reductions of about 50% in the quantity of coke deposited on the catalyst in this process. It has also been responsible for substantial increases in liquid yield and the quality of the liquid product and the catalyst regenerator burn-off duty.

The improved process of this invention is particularly successful in the catalytic reforming (paraffin cyclization and naphthene dehydrogenation) of naphtha or gasoline streams at temperatures of the order of from 700° F. to 1100° F., at pressures of from about 200 p.s.i.g. to about 750 p.s.i.g., and in the presence of recycle hydrogen in the amounts between about 500 and 10,000 s.c.f. (standard cubic feet) per barrel of naphtha feed. The preferred type of catalyst is the $CoO-MoO_3$ or cobalt molybdate type on an activated alumina support and analyzing between about 7% and about 22% total CoO plus $MoO_3$ and in which the molecular ratio of CoO to $MoO_3$ is between about 0.4 to 5.0. Some suitable methods of preparation are given in U.S. Patents Nos. 2,369,432, 2,325,033, and 2,486,361. These catalysts also may incorporate between about 3% and about 8% of $SiO_2$ as heat stabilizers.

The desulfurization of gas-oil and naphtha is effected in the process of this invention using the same catalyst, hydrogen recycle rate conditions as above for reforming, except that the temperature range is reduced to between about 600° F. and about 850° F. The maximum pressure can be increased to as high as 5000 p.s.i.g., and the reaction is exothermic so that cold hydrogen injection is used for temperature control.

In the process of the present invention as stated briefly above, the granular contact material is conveyed from the bottom to the top of the contacting column through a conveyance zone in which the granular solids are maintained substantially at their static bulk density, that is, in the form of a substantially compact dense packed mass. In order to accomplish this conveyance, several essential requirements must be met. These essentials are described below.

The granular solids flow by gravity from the bottom of the column with the conveyance fluid into the conveyance conduit inlet and are then transferred through the conveyance conduit in compact form by means of the concurrently depressuring conveyance fluid. The frictional forces generated by the conveyance fluid depressuring through the interstices of the fluid permeable compact mass of granular solids are sufficient to generate a pressure gradient in the flow direction sufficient to counteract opposing forces of friction of the solids sliding against the walls of the conduit as well as the opposing force of gravitation. Thereby movement of the compact porous granular mass in the direction of decreasing conveyance fluid pressure is established and maintained so long as solids are fed at the inlet and removed from the outlet.

The depressuring conveyance fluid generates a pressure differential per unit length of conduit $$\frac{dp}{dl}$$

sufficient to overcome the opposing gravitational forces ($\rho_s \cos \theta$), wherein $\rho_s$ is the bulk density of the granular solids, and $\theta$ is the angular deviation of the conveyance conduit from an upward vertical reference axis. The ratio of the former to the latter is $$\frac{\frac{dp}{dl}}{\rho_s \cos \theta}$$

This factor is termed the conveyance force ratio and is the ratio of the force tending to move the solids through the conveyance conduit to the opposing forces of gravity tending to restrain such flow. The conveyance fluid must be depressured through the conduit at a rate sufficient to raise the conveyance force ratio to a value greater than 1.0 (factors in any consistent units) in order that the conveying force exceed the forces resisting flow. The amount by which the conveyance force ratio must exceed a value of 1.0 is equal to the magnitude of the friction forces also tending to resist solids flow.

The granular solids are maintained during conveyance in compact form at their static bulk density by means of the application of a thrust or solids compressive force on the stream of solids issuing from the outlet of the conveyance conduit. Various means are available for applying such a force which has the effect of restricting the discharge rate of granular solids from the conveyance conduit but has virtually no effect on the discharge of the conveyance fluid therefrom. A transverse thrust plate or a grid may be spaced opposite and adjacent the outlet opening, or a static bed of solids may be used to submerge this outlet.

Thus, it is essential that the inlet of the conveyance conduit be kept submerged in a bed of solids to be conveyed, that the conveyance fluid flows through the conveyance zone at a rate sufficient to generate a conveyance force ratio greater than 1.0 throughout the conveyance zone, and that means be provided for restricting the solids discharging from the conveyance zone. This latter means usually includes a solids flow control means to regulate the rate at which the discharged granular solids are withdrawn from the vessel surrounding the conveyance zone outlet and to maintain the outlet submerged in a moving bed of discharged solids which serves to restrict solids discharge.

The process and apparatus of the present invention will be more readily understood by reference to the accompanying drawing which combines an elevation view in partial cross section of the regenerator-reactor column of this invention with a process flow sheet illustrating the application of this invention to the upgrading of a sulfur and nitrogen compound contaminated naphtha hydrocarbon fraction.

The description of the drawing which follows is by way of an example of the present invention applied to the combined desulfurization, denitrogenation, and reforming of a low-grade petroleum naphtha in the presence of a cobalt molybdate catalyst.

Referring now in particular to the drawing, the catalyst solids pass downwardly by gravity as a dense moving bed from solids receiving zone 10 successively through primary seal gas disengaging zone 12, regeneration zone 14, secondary sealing zone 16, catalyst reduction zone 18, and reaction zone 20. The reaction zone 20 actually consists of a plurality of superimposed reaction zones 22 and 24 with interposed temperature control zones 26. Although only two reaction zones 22 and 24 and a single temperature control zone 26 are shown for purposes of clear illustration, in actual installations a plurality of up to 8 or 10 individual reaction zones with up to 7 or 9, respectively, temperature control zones may be employed depending upon the degree of the normal adverse temperature change and the degree to which constant temperature is desired throughout the reaction zone. The solids continue downwardly through feed engaging zone 28, stripped naphtha and stripping hydrogen disengaging zone 30, spent catalyst stripping zones 32, solids flow control zone 34, hopper zone 36, elutriation zone 38, and outlet zone 40.

The regeneration and reaction zones are operated at a pressure of about 400 p.s.i.g. The pressure differential between the bottom and the top of conveyance zone 42, communicating between points "C" at the bottom and the top of the apparatus, is about 100 p.s.i. Accordingly the spent solids from the bottom of zone 40 are passed downwardly through outlet line 44 controlled by motor valve 46 into solids pressuring zone 48. Recycle hydrogen at a pressure of 520 p.s.i.g. is introduced through line 50 controlled by valve 52 and flows through manifold 54 into pressuring zone 48 raising the pressure of the gas present in the interstices of the granular solids to a value of about 500 p.s.i.g. Then valve 55 is opened, discharging the pressured solids into induction zone 56 for conveyance. Subsequently valve 57 is opened, depressuring pressure zone 48 again to about 400 p.s.i.g. by discharging gas through manifold 54 and line 59, and then valve 46 is reopened to receive additional quantities of spent catalyst.

Additional recycle gas, the conveyance fluid, is introduced through line 58 at a pressure of about 500 p.s.i.g. and a rate controlled by valve 60 into induction zone 56. It flows concurrently with the spent solids upwardly through conveyance zone 42 from point "C" at the bottom of the apparatus to point "C'" near the top of the apparatus for discharge into solids receiving zone 10 completing the solids cycle. The solids are discharged into zone 10 at a pressure of about 400 p.s.i.g. against cap 62 which, in conjunction with the dense downwardly moving mass 64 of discharged solids restricts the flow of solids from conveyance zone 42 and maintains them therein at a bulk density substantially equal to the static bulk density of the granular solids when at rest. This density is substantially the same as that of the downwardly moving mass of catalyst solids in the regenerator-reactor column.

The total flow of cold recycle gas (110° F.) required in operating pressuring zone 48 and the conveyance zone 42 is about 3200 M s.c.f./d. (one M s.c.f./d. is 1000 standard cubic feet per day). The inventory of catalyst solids in the system is continuously indicated by solids level indicator 66 which detects the position of the solids level in induction zone 56. Solids valves 46 and 55 and gas valves 52 and 57 are operated continuously in the sequence described above by means of a cycle timer operator 68 so that spent solids are continuously pressured from the bottom of the column into the bottom of the lift line at a rate equal to the solids circulation rate determined by solids flow control zone 34.

The naphtha to be catalytically treated according to the process of the present invention flows through line 70 at a rate of 18,700 b./s.d. (barrels per stream day) controlled by valve 72 and flow recorder controller 74. This naphtha has the following physical properties:

*Table I*

| | |
|---|---:|
| Boiling range, °F. | 210–400 |
| Gravity, °A.P.I. | 51 |
| Sulfur, weight percent | 0.07 |
| Nitrogen, weight percent | 0.003 |
| Knock rating, F–1 clear | 55 |

This feed stock flows through preheating exchanger 76 wherein it is heated to a temperature of about 695° F. in exchange with the reactor effluent flowing in exchanger 76'. The partially preheated naphtha then passes through feed vaporizer 78 wherein the evaporation is completed and the feed is preheated to a temperature of 935° F. and passes through line 80 into feed mixing zone 82.

Mixing zone 82 comprises a relatively elongated conduit receiving naphtha vapor at one end and opening directly into feed engaging zone 28 at its downstream end. At its upstream end naphtha vapor is introduced through a restriction generating a high velocity stream or jet within the mixing zone thereby creating a reduced pressure region. Conduit 84 communicates stripped naphtha disengaging zone 30 with a point along the length of mixing zone 82 immediately adjacent the high velocity naphtha stream. This maintains disengaging zone 30 at a reduced pressure thereby drawing a mixture of stripping hydrogen and stripped residual hydrocarbons therefrom into mixing zone 82 for thorough mixing with the feed vapor.

The mixture of residual stripped naphtha and stripping hydrogen originates in stripping zones 32 having a total cross sectional area considerably reduced from the column cross section. This reduced area permits efficient spent catalyst stripping with a minimum of stripping gas. In the present case, stripping hydrogen at a temperature of 935° F. passes through line 86 at a rate of 39,200 M s.c.f./d. controlled by valve 88 and flow recorder controller 90. This stripping gas flows into stripping gas engaging zone 92, and is engaged with the downwardly moving streams of spent catalyst by passing through gap 94 at the bottom of stripping conduits 32. In passing countercurrently to the spent catalyst, the residual quantities of naphtha are stripped forming the mixture referred to previously which is disengaged from zone 30 and mixed with the feed vapor in mixing zone 82. Thus no feed is lost to the regenerator with spent catalyst.

Preferably the mixing zone 82 has a length measured between the nozzle and the column wall which is about five times the diameter of mixing zone 82. If desired, the form of engaging-disengaging apparatus described above in connection with the introduction of naphtha to the column may be substituted by the engaging-disengaging system employed in the temperature control zones 26 and which will be described in detail below.

The reactant mixture of feed naphtha and recycle hydrogen passes upwardly from feed engaging zone 28 countercurrently to the catalyst in lower reaction zone 24. Due to the net endothermic heat of reaction, the temperature of the reactant mixture tends to decrease from the desired temperature of 910° F. By the time the reactant mixture reaches the first temperature control zone 26 the temperature has decreased to about 885° F. and in the present invention the mixture is reheated to about 935° F. by the injection of a stream of hydrogen heated to about 1250° F.

Temperature control zone 26 consists of upper engaging zone 96 and lower disengaging zone 98. These zones are provided by means of a pair of closely spaced trays having dependent downcomers and which are supported at their peripheries at the walls of reactor column 20. If desired, these downcomers may continue from the top tray through the lower one. Disposed between the downcomers in disengaging zone 98 is one or more mixing conduits 100. Injection hydrogen at a temperature of 1250° F. and 405 p.s.i.g. flows at a rate of 28,000 M s.c.f./d. through line 102 controlled by valve 104. In the present illustration two mixing zones 100 and 101 are employed although a greater or a fewer number may be used if desired. In the modification shown the injection hydrogen is split into two portions by means of valves 106 and 108. One-half of the stream flows through line 110 and nozzle 112 directly into the lower or inlet end of mixing zone 100, while the other half flows through line 111 similarly into zone 101. Again the low-pressure region is maintained in each mixing zone which maintains a relatively low pressure in disengaging zone 98 thereby disengaging at least the major portion of the reactant mixture from the catalyst at the top of reaction zone 24. The disengaged mixture is drawn into mixing zones 100 and 101, thoroughly mixed with and reheated by the injection hydrogen, and is discharged upwardly through the lower tray into the upper engaging zone 96 at a temperature of about 935° F. The reheated mixture flows upwardly through gas riser caps 114 and continues upwardly through the next superjacent reaction zone 22 for further reaction.

As previously indicated, a plurality of these temperature control zones 26 is customarily employed in the process of this invention. In the actual process described here by way of an example, three such temperature control zones were used and only the intermediate control zone is shown in the accompanying drawing. Through line 116 the primary stream of injection hydrogen was introduced at a rate of 24,300 M s.c.f./d. controlled by valve 118 into the lower control zone. Through line 120 injection hydrogen stream was introduced at a rate of 31,800 M s.c.f./d. controlled by valve 122 into the upper control zone. In each case the temperature of the injected hydrogen was 1250° F. and the quantity was controlled to reheat the reactant mixture from about 885° F. to about 935° F. to maintain an average reaction temperature throughout the reactor of about 910° F.

The reactor effluent disengages from the catalyst mass in effluent disengaging zone 124 and flows through line 126 to cooling and condensing facilities described below. To the effluent vapor is added the hot hydrogen depressuring from pressuring zone 48 and flowing through line 59 between points "B" and the hydrogen stream employed to convey the solids through conveyance zone 42. This latter stream is added by means of line 128 described below.

This effluent flows at a rate of 156,400 M s.c.f./d. at a temperature of about 885° F. into effluent cooler and condenser 76' wherein the hydrocarbon fraction is condensed and heats the feed stream as described. The partially condensed mixture is introduced into separator 132 from which the condensed liquid product is removed through line 134 at a rate of 18,100 b./s.d. controlled by valve 136 and liquid level controller 138.

The uncondensed fraction consists principally of recycle hydrogen including the net hydrogen produced in the process. This gas is removed from separator 132 through line 140 and a portion thereof is produced as a net gas product from the process through line 142 at a rate of 12,890 M s.c.f./d. controlled by pressure controller 144. The remainder of this recycle gas is passed at a rate of 133,130 M s.c.f./d. through line 144 into recycle gas compressor 146 wherein it is compressed to a pressure of about 425 p.s.i.g. This compressed recycle gas is divided into several streams.

One part of this gas flows through line 148 and lift gas compressor 147 at a pressure of 530 p.s.i.g. between points "D" at a rate of 3200 M s.c.f./d. to supply pressuring zone 48 and induction zone 56 referred to above.

A second relatively minor part of this recycle gas passes at a rate of 1230 M s.c.f./d. through lines 149 between points "E" as an elutriation gas controlled by valve 151 into elutriation gas engaging zone 153 at the bottom of the column. It passes upwardly countercurrently to the discharging solids in elutriation zone 38, suspends the fine solids therefrom, flows out through line 155 controlled by valve 157, and continues between points "A" for combination with the lift gas in line 192, subsequently described, disengaged from solids receiving zone 10.

A third minor part of the compressed recycle hydrogen flows through line 172 at a rate of 5400 M s.c.f./d. controlled by valve 174 and at about 132° F. into reduction gas engaging zone 176. This gas flows downwardly through the gap between reduction zone conduits 18 and the top of the downcomers located in effluent disengaging zone 124. A minor portion of this third part of the hydrogen passes downwardly concurrently with the catalyst as a seal gas into the reactant effluent disengaging zone 124 to prevent flow of fluids between the reactor and the regenerator. The major portion of this third part of hydrogen passes upwardly countercurrently to the regenerated catalyst in reduction zones 18 to produce a reduced catalyst of highest activity. This gas is collected in secondary seal gas disengaging zone 178 wherein it is mixed with a minor portion of regeneration gas passing downwardly concurrently with the solids from regeneration gas disengaging zone 180. This forms the secondary seal gas mixture which is removed from zone 178 through line 182 at a rate of 8000 M s.c.f./d. controlled by valve 184 and differential pressure controller 186.

The major remaining portion of the recycle gas separated from the cooled effluent flows at a rate of 144,500 M s.c.f./d. through line 150 and exchanger 152 wherein it is preheated to a temperature of about 695° F. in exchange with the reactor effluent. The major portion of this recycle gas flows through line 156 at a rate of 121,000 M s.c.f./d. controlled by valve 158 into recycle gas superheater 160 wherein it is heated to 1250° F. This gas is discharged through line 162 and supplies the three individually controlled streams of injection hydrogen into the reactor at the rates described, as well as a minor portion which flows through line 164. This minor part is combined with partially preheated hydrogen bypassing superheater 160 through line 166 at a rate of 23,500 M s.c.f./d. controlled by valve 168 and temperature recorder controller 170 to produce the 39,200 M s.c.f./d. stream of stripping hydrogen at 935° F. referred to previously and which is introduced into stripping zone 32.

As stated previously, the spent catalyst is conveyed by means of a concurrent flow of hydrogen recycle gas. The major portion of the conveyance gas in disengaged from the bed of solids 64 in solids receiving zone 10 and is removed therefrom through line 188 at a rate controlled by valve 190. It is combined, as previously stated, with the elutriation gas containing the solids fines. The lift gas disengaged in vessel 10 also contains elutriated fines. The combined hydrogen-solids stream flows through line 192 through cyclone or other solids separator 194 in which the solids are separated. The fines-free hydrogen continues, as stated above, through line 128 for combination with the reactor effluent.

A minor portion of the conveyance gas passes downwardly with the solids into primary seal gas disengaging zone 12. Herein it is mixed with a minor portion of fresh regeneration gas flowing upwardly from regeneration gas engaging zone 196. This comprises the primary seal gas which prevents the regeneration gases and conveyance gases from mixing. The primary seal gas is removed through line 198 at a rate controlled by valve 200 and differential pressure controller 220'. It is combined with the secondary seal gas flowing in line 182 and may be used for fuel because of its hydrogen content.

The spent catalyst is regenerated by oxidation in regeneration zone 14 in the presence of a flue gas recycle passing downwardly concurrently with the solids. The spent regeneration gas is removed from disengaging zone 180 through line 204 at a temperature of 1050° F. and a pressure of about 390 p.s.i.g. It is cooled in exchanger 206 to a temperature of about 700° F. in exchange with water for steam generation. The exothermic heat of regeneration is thus dissipated and recovered for use in the process. The cooled flue gas continues through line 208 under the influence of recycle blower 210 having a discharge pressure of about 397 p.s.i.g. air as the source of oxygen is introduced through line 212 at a rate of 6880 M s.c.f./d. controlled by valve 214 and oxygen recorder controller 216 to produce a fresh regeneration gas containing about 1.8% oxygen. This mixture is returned through line 218 to regeneration gas engaging zone 196 to complete the regeneration gas recycle. Oxygen concentrations of between about 0.5% and 10% may be used.

The net production of flue gas caused by coke burn-off in the regeneration zone is removed from the regeneration gas recycle stream as the primary and secondary seal gases referred to above, although if desired, excess amounts of this gas may be discharged to the atmosphere directly through line 220 controlled by valve 222.

In the process of the present invention the upgraded or treated naphtha product was produced at a rate of 16,270 b./s.d. corresponding to a liquid yield of 87.0%. The liquid product had the following properties:

*Table II*

| | |
|---|---|
| Boiling range, ° F | 100–400 |
| Gravity, ° A.P.I. | 50 |
| Sulfur, weight percent | 0.001 |
| Nitrogen, weight percent | 0.003 |
| Knock ratings— | |
| F-1 clear | 92 |
| F-1+3 cc. TEL | 100 |

The foregoing description of the drawing, given by way of an example of the application of this invention as applied to catalytic upgrading of naphtha contaminated with hydrocarbon derivatives of sulfur and nitrogen, is intended to be illustrative only of the process and apparatus of this invention. The process with its specific features of plural reactant premixing and intermediate temperature control and the others described may also be applied with advantage to other hydrocarbon treating processes and to the other solids-fluid contacting processes in which the aforementioned problems occur.

For example, the present invention may also be applied to the desulfurization and denitrogenation of gas-oils. In such a process identical problems of solids conveyance and attrition present themselves. The temperature control problem is one of cooling the reactant mixture at various points along the length of the reactor. In this situation the same apparatus above described may be used except for the adjustment in the operation of recycle gas heater 160. For desulfurization purposes the hydrogen is reheated to about the desired desulfurization temperature and only in an amount sufficient to provide the stripping hydrogen and the hydrogen desired to be introduced with the feed stock. The injection or tempertaure control hydrogen bypasses heater 160 and is introduced at approximately atmospheric temperature directly into the temperature control zones.

For the treatment of gas-oil fractions, the liquid hourly space velocity is preferably about 2.0, the catalyst residence time in the reaction zones is preferably about 24 hours, the average reactor temperature is preferably about 700° F., and the average reactor pressure is preferably about 600 p.s.i.g. The average hydrogen to gas-oil ratio in the reactor is preferably about 4000 standard cubic feet per barrel.

Following the description of this invention above the principles of the present invention may be applied to the other solids-fluid contacting processes by those skilled in the art with the realization of substantially all of the advantages outlined.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:
1. An apparatus for continuously contacting a recirculating stream of solid contact material with a fluid to be treated at controlled temperatures which comprises a single vertical contacting column provided at successively lower levels with solids regeneration section, a sealing section, a solids pretreating section, a contacting section provided at its upper end with a fluid disengaging section and a fluid engaging section at its lower end and with at least one temperature control fluid injection section therebetween, a solids stripping section, a solids flow control section, and an elutriation section; said temperature control sections comprising a pair of close-spaced horizontal transverse trays with open-ended downcomers depending therefrom supported within said column, at least one elongated mixing conduit communicating at its inlet below the lower tray and extending to its outlet at a point below the upper tray; at least one solids pressuring vessel connected through a valved conduit vessel and through another valved conduit in solids delivery relation to an induction vessel, an elongated conveyance conduit extending from the bottom of said induction vessel up the side of said contacting column to a solids receiving vessel connected in gravity delivery relation to the top of said column, fluid cooling and condensing means connected in fluid receiving relation to said fluid disengaging section and in fluid delivery relation to a liquid-vapor separator, a lower outlet conduit from said separator for liquid, gas compressing means connected in fluid receiving relation to said separator; separate means connecting the compressing means discharge to said pretreating section, said elutriation section, each of said temperature control sections, said stripping section, and through a second compressing means to said pressuring vessel and said induction vessel; said means connecting said compressing means discharge with said temperature control section comprising an elongated conduit opening coaxially into the inlet into each of said mixing conduits, means for fluid flow control disposed in each of said last-named means to maintain a high velocity jet of fluid into each mixing conduit, an outlet conduit for conveyance fluid from said solids receiving means, an outlet conduit from said sealing section, a heat exchanger, means for recirculating a regeneration fluid through said exchanger and said regeneration section, and an inlet conduit for fluid to be contacted communicating with said fluid engaging section.

2. An apparatus according to claim 1 in combination with a disengaging section disposed in said column between said fluid engaging section and said stripping section, an elongated mixing conduit opening into said engaging means, said inlet conduit opening into said mixing conduit so as to maintain therein a high velocity jet of fluid, and a conduit opening from said disengaging means into said mixing conduit for fluid flowing from said stripping means.

3. An apparatus according to claim 1 in combination with a solids-fluid separator, means connecting it in fluid receiving relation with the fluid outlet from said solids receiving vessel and with said elutriation section, an outlet for solids therefrom, and means connecting it in fluid delivery relation with said cooling and condensing means.

4. An apparatus according to claim 3 in combination with valved conduit means connecting said pressuring vessel with said cooling and condensing means.

5. An apparatus according to claim 1 in combination with gas heating means connected in the conduit means opening from the discharge of said gas compressing means and said temperature control sections.

6. In a contacting column adapted for contacting a fluid reactant with a compact bed of granular catalyst, the combination therewith of an improved intermediate fluid injection and mixing apparatus adapted to introduce a temperature-control fluid at an intermediate point in said column and to premix said temperature-control fluid with the reactant fluid traversing said column before contacting the catalyst therein, which comprises a pair of spaced transverse plates, A and B, supported horizontally at an intermediate point in said column, at least one open-ended mixing conduit extending through one of said plates A and terminating at its outlet end in the interspace between said plates, the inlet end of said mixing conduit terminating at a point in the column on the reverse side of said plate A, a fluid inlet conduit extending through the shell of said column and terminating coaxially with and near the inlet end of said mixing conduit in such manner as to provide an annular fluid-entry space between the outer periphery of said inlet conduit and the inner periphery of said mixing conduit, a fluid outlet means traversing said plate B and communicating said interspace with the column space on the reverse side of said plate B, and operative means connected to said fluid inlet conduit for the injection of said temperature-control fluid.

7. An apparatus as defined in claim 6 including in combination therewith a plurality of open-ended catalyst transfer tubes vertically traversing said plates and adapted to provide a catalyst passageway through both of said plates.

References Cited in the file of this patent

UNITED STATES PATENTS

| | | |
|---|---|---|
| 2,689,825 | Imhoff et al. | Sept. 21, 1954 |
| 2,756,192 | Bergstrom | July 24, 1956 |
| 2,758,065 | Halik | Aug. 7, 1956 |
| 2,809,922 | Berg et al. | Oct. 15, 1957 |